Jan. 20, 1959   R. H. COOPER ET AL   2,869,191
COMPOSITION COMPRISING SAND, PHENOLIC RESIN AND
ANHYDROUS SODIUM CARBONATE, METHOD OF MAKING
AND REFRACTORY ARTICLE PRODUCED
Filed Sept. 26, 1956

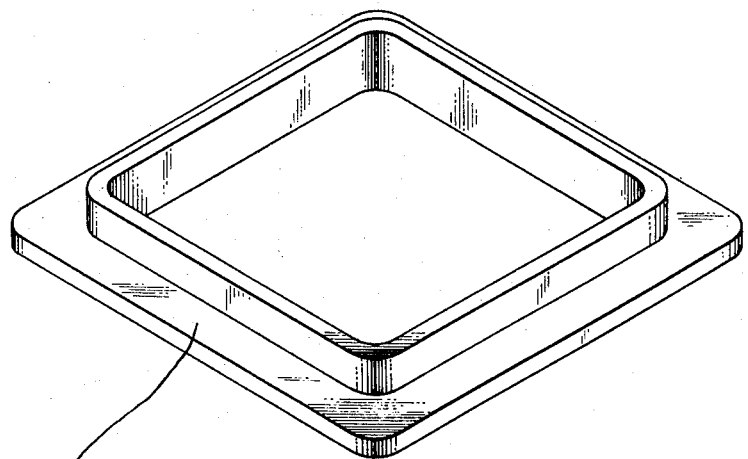

Refractory ring for hot top devices fabricated from coated sand composition containing soda ash and catalyzed phenolic liquid resin binder.

INVENTORS.
Ronald H. Cooper
Gerald M. Corbett

BY *Griswold & Burdick*
ATTORNEYS

United States Patent Office 2,869,191
Patented Jan. 20, 1959

2,869,191

COMPOSITION COMPRISING SAND, PHENOLIC RESIN AND ANHYDROUS SODIUM CARBONATE, METHOD OF MAKING AND REFRACTORY ARTICLE PRODUCED

Ronald H. Cooper, Clare, and Gerald M. Corbett, Midland, Mich., assignors to The Dow Chemical Company, Midland, Mich., a corporation of Delaware Application September 26, 1956, Serial No. 612,287

14 Claims. (Cl. 22—147)

This invention relates to improved compositions for the fabrication of refractory structures that are fluid-permeable and capable of withstanding heat at extreme temperature elevations such as is encountered from contact with molten metals, including iron and steel alloys. In particular, the invention relates to improved compositions that are especially suitable for the fabrication of refractory rings or spacers which are employed with hot top molds in the casting of iron and steel ingots to protect the iron casing of the hot top on the mold from the action of the hot molten metal being poured. It also has reference to a method for the fabrication of such structures with the compositions and to the structures thereby provided.

Refractory rings for hot tops which are positioned between the hot top and the top of the ingot mold in washer-like fashion and which oftentimes have an annular configuration are conventionally prepared from one of several various compositions. By way of illustration, they are frequently fabricated from a silicate bonded mixture of sand plus oil bearing shale and a small quantity of ferrous sulfate. Such mixtures may contain from 17 to 19 percent or more or less by weight of sodium silicate solution as a binder material. Or they may be fabricated from refractory materials comprised essentially of clays admixed with either metallic oxides, carbon or granular coke.

Certain difficulties and disadvantages are commonly encountered with the conventional refractory hot top rings. Sometimes, for example, they may tend to adhere tenaciously and in a most objectionable manner to the solidified metal in the ingot that is in contact with them. In addition, the conventional refractory rings for hot tops are somewhat brittle and fragile and for this reason, are susceptible to a substantial incidence of breakage during their shipment and handling. Furthermore, some of the conventional hot top rings, such as the silicate bonded varieties, require the employment of considerable quantities of a binder material to be formulated in the compositions that are utilized for their fabrication.

It would be advantageous, and it is among the principal objectives of the present invention, to provide compositions for fabrication into refractory hot top rings that would be capable of being fabricated into such structures having ample permeability and uniform good porosity to allow efficient gas evolution from the molten metal being poured into ingots, little tendency to adhere or "peel off" on the ingot, good characteristics of being readily disintegrated after employment at high temperatures, little likelihood of breakage due to inherent brittleness and fragility, and modest binder requirements for their suitable fabrication. It would also be advantageous and beneficial, and it is also among the objectives of the invention, to provide a method for the fabrication of such structures from such compositions and to also provide the structures comprised of such compositions.

According to the present invention, these desiderations and other advantages and benefits may be realized and the indicated objectives may be achieved by a composition that comprises a preponderant proportion of relatively coarse sand; a binding proportion of an active powdered magnesium oxide catalyzed aqueous phenolic liquid thermosetting resin; a small quantity of soda ash (sodium carbonate) or its equivalent; and optionally and beneficially, another small quantity of a finely divided blast furnace slag powder or particles. Advantageously, the composition may be comprised of a preponderant proportion of relatively coarse sand; between about 3 and 10 percent by weight, based on the weight of the composition, of an aqueous phenolic liquid thermosetting resin binder that is catalyzed with from about 10 to 25 percent by weight, based on the weight of the resin in the composition, of an active powdered magnesium oxide catalyst; between about 10 and 25 percent by weight, based on the weight of the resin in the composition, of anhydrous sodium carbonate; and optionally, between about 10 and 100 percent by weight, based on the weight of the resin in the composition, of a finely divided blast furnace slag.

The compositions, freshly after being prepared, are plastic and flowable coated sand mixtures that can be cold worked to form desired structures while they are in a wet condition. Thus, they can be cold pressed as by being rammed into mold forms, advantageously under pressures between about 100 and 1200 pounds per square inch, to form a desired structure of the agglomerated, integrated mixture. Or, if desired, they can be deposited into desired forms with the assistance of a pneumatic blast or spray operating under pressure, as, for example, in the neighborhood of 80–100 pounds per square inch, much in the manner of the core blowing techniques that are employed for sand compositions in certain types of foundry practice. During or after the wet formation of the structure, the agglomerated composition will self-set or auto-harden to an integrated, bonded magma structure, due primarily to the action of the active magnesium oxide catalyst on the applied resin that coats the sand in the composition. The self-setting or auto-hardening of the wet-formed composition ordinarily occurs within an hour at room temperature, after which the structure may be cured at temperatures between about 250 and 600° F. until it has been completely thermoset to a strong rigid form suitable for the intended employment. Generally, the auto-hardened structures may be satisfactorily cured by exposure to a thermosetting temperature of about 475–500° F. for a period of time of at least about 45 to 60 minutes.

The cured structure, when it is a refractory ring for hot tops, may then be employed to protect the casing of metal hot tops by preventing leakage of the molten metal from the mold. The extreme heat from the molten metal that is being poured will decompose and burn out the cured phenolic resin binder to leave a strong and uniformly porous refractory structure that provides an easy escape for the gases that are being evolved from the molten metal while restraining it, much in the manner of a sealing washer, from leaking so as to damage the metal casing of the hot top being employed on the ingot mold. In this connection, care should be taken when curing the refractory structure prepared according to the invention to utilize a sufficiently high thermosetting temperature. The employment of too low a temperature for this purpose may not only cause a relatively weak structure to be encountered but may cause difficulties in the decomposition of the resin binder upon contact with heat from the molten metal or other source. Improperly cured ring structures for hot tops may evolve considerable quantities of fire and smoke upon contact with the molten metal and may severely carbonize the ingot being poured. In contrast, properly cured structures display greatly minimized tendencies for such behavior. An annular refractory ring for hot tops that has been prepared from a composition in accordance with the present invention is schematically illustrated in the accompanying drawing.

Any ordinary sand may be employed in the practice of the present invention. Advantageously, the sand that is employed has a fineness in accordance with the values proposed by the American Foundryman's Society (AFS) that is in the numerical range between about 25 and 125. Such sands, for example, as the varieties that are commonly employed as core sands including the types which are known as Berkeley Float Sand, Juniata Sand, Lake Sand, Vassar Sand, Wedron Sand, Portage 40–60 Sand, Gratiot Bank Sand and the like may be beneficially employed. It is desirable that the sand be clean and substantially free from foreign metal oxides, clay, moisture and organic matter. In many cases, it may be more advantageous to employ a sand having an AFS fineness number from about 30 to 75.

As has been indicated, the resin binder that is employed in the compositions of the present invention is a self-setting or auto-hardening mixture of an aqueous phenolic liquid resin, such as a phenol-formaldehyde liquid resin, and an active powdered magnesium oxide catalyst that is capable of dehydrating and auto-hardening the liquid resin at room temperatures to a dry, thermoplastic-thermosetting mass. Such a resin binder for inert filler materials is described in the copending application of Ronald H. Cooper covering Improved Phenolic Resin Compositions having Serial No. 612,283 that was concurrently filed on September 26, 1956. Thus, the phenolic liquid resin that is employed may be a phenol-formaldehyde condensation product, of the type that is oftentimes characterized as being a stage "A" resin, that has been prepared by reacting aqueous mixtures of phenol and formaldehyde, in a known manner, under the influence of basic catalysis. Such liquid resins usually have a greater than 1:1 mole ratio of formaldehyde to phenol, respectively, in their compositions. It is oftentimes desirable for a phenol-formaldehyde liquid resin to be employed that has a mole ratio of formaldehyde to phenol in the neighborhood of 1.45:1. The solids content of the liquid resin should be at least 50 to 60 percent by weight and it may have a viscosity from about 100 to 1000 centipoises at 77° F., and a pH from about 5 to 9. The active powdered magnesium oxide catalyst that is incorporated in such a phenolic liquid resin to achieve its auto-hardening properties may be a finely divided powder that has initial setting characteristics, measured as a function of time according to the procedure set forth in A. S. T. M. specification No. C254–50T, that is between about 0.1 and 6 hours. Generally, it is beneficial to utilize a magnesium oxide powder that has an average particle size not larger than about 40 mesh in the U. S. sieve series and an initial setting time between about 0.5 and 3 hours.

The time that is required for a magnesium oxide catalyzed phenolic liquid resin to self-set or auto-harden due to the involved catalytic effect depends to a great extent upon the activity or initial setting time characteristics of the magnesium oxide powder and the proportion in which it is included with the phenolic liquid resin in the binder. This, of course, limits the time in which a composition prepared with such a liquid resin binder is plastic and flowable so that it may be cold formed to a desired refractory structure (such as an annular ring for hot tops) as a wet, coated sand composition after its initial preparation. Generally, more active magnesium oxide powders (materials having shorter initial setting times) and greater proportions of included catalyst result in wet mixtures that auto-harden in shorter periods of time after their initial preperation. Compositions that are in accordance with those of the present invention may ordinarily be found to be auto-hardenable within about an hour of their initial preparation, especially when they are catalyzed by a powdered magnesium oxide that has an initial setting time of about 0.5 hour.

The particulated blast furnace slag that may advantageously be employed in the compositions of the invention may be a typical slag, in finely divided form, that has been obtained from a blast furnace making basic iron. Such a slag is often found to contain about 48 percent by weight of a mixture of silica ($SiO_2$) and alumina ($Al_2O_3$) in which the proportion of alumina may vary from 10 to 15 percent by weight of the entire slag and about 48 percent by weight of a mixture of lime (CaO) and magnesia (MgO) in which the proportion of magnesia seldom if ever, exceeds 10 percent by weight of the entire slag, with the balance usually being comprised of minor proportions of calcium sulfide and ferrous and manganese oxides. Representative analyses of suitable blast furnace slags for employment in the practice of the invention are as follows:

| Component | Percent By Weight | |
|---|---|---|
| | Slag "X" | Slag "Y" |
| Silica ($SiO_2$) | 35.02 | 34.50 |
| Alumina ($Al_2O_3$) | 14.99 | 13.40 |
| Lime (CaO) | 44.03 | 40.70 |
| Magnesia (MgO) | 2.72 | 5.58 |
| Ferrous Oxide (FeO) | 1.16 | 0.65 |
| Manganese Oxide (MnO) | 1.08 | 0.30 |
| Sulfur (S) | 1.35 | 1.09 |

Advantageously, the finely divided blast furnace slag that is utilized has an average particle size not larger than about 100 mesh in the U. S. sieve series. If desired, it may sometimes be beneficial to add small quantities of other materials, such as fusible silica glass powder, to the mixtures to assist in binding the ring when it is under the influence of heat from the molten metal after the resinous binder has been decomposed.

In the formulation of the compositions of the invention, it is essential to achieve a uniform and thorough dispersion and interblending of all the ingredients. It is particularly advantageous to prepare the composition by intimately pre-mixing the powdered magnesium oxide catalyst with the sand before homogeneously incorporating the liquid resin therein with sufficient mixing to thoroughly coat the sand granules after which the soda ash and blast furnace slag particles or powder, if the latter is to be employed, can be intermixed homogeneously in the wet composition as may any other ingredients, such as fusible silica glass powder, that may be desired. The formulation can be readily achieved using many available varieties of efficient mixing and mulling apparatus.

The invention is further illustrated in and by the following examples wherein, unless otherwise indicated, all parts and percentages are to be taken by weight.

*Example I*

A composition prepared according to the present invention had the following formulation:

| Component: | Percent |
|---|---|
| AFS 33 core sand | 89.20 |
| Aqueous phenolic liquid resin | 8.00 |
| 40 mesh, ½ hour magnesium oxide powder | 0.80 |
| Anhydrous sodium carbonate (soda ash) | 0.40 |
| 100 mesh blast furnace slag powder | 1.60 |

The phenolic liquid resin had a formaldehyde to phenol mole ratio of about 1.45:1, a solids content of about 50–60 percent, a pH of about 8 and a viscosity at 77° F. of about 300 centipoises. The constitution of the slag was siimlar to that of the analysis given for slag "Y" in the foregoing specification. The composition was prepared by intimately premixing about 53.52 parts of the sand with about 0.48 part of the magnesium oxide powder. To the dry mixture there was gradually added, with efficient continuous mixing, about 4.8 parts of the liquid resin to thoroughly coat the sand. About 0.24 part of the dry soda ash and 0.96 part of the blast furnace slag powder were then homogeneously dispersed in the wet mixture.

The wet mixture was then cold formed in a mold under a ram pressure of about 100 pounds per square inch into square ring structures for hot tops having about a 2⅜ inch inside height, about a 1½ inch outside height, about a 1 inch peripheral lip portion, and inner and outer dimensions, respectively, of about 20¼ and 27½ inches with about 3 inch radii at the outer corners and about 1¼ inch radii at the inner corners. After being molded, and while remaining in the mold form, the cold formed ring structures were permitted to auto-harden at room temperature to an agglomerated, composite, integral mass. This was accomplished in about an hour after which the rings were cured for about 60 minutes in a gas fired oven at a temperature of about 482° F. The thermoset rings could then be easily removed from the mold form by simple inversion thereof. They had an average density of about 110 pounds per cubic foot, an average tensile strength of at least about 650 pounds per square inch and an average compression strength of about 3,000 pounds per square inch. The finished rings performed excellently during tests in the pouring of ingots in hot top molds. They did not permit the molten metal to leak nor did they fail in service or permit any damage to the metal casing of the hot top. They did not fire and smoke excessively from decomposition of the resin binder and had satisfactory porosity during the pour. In addition, they did not adhere to the ingots nor were they difficult to remove therefrom but disintegrated readily within ½ hour of burn out.

*Example II*

The procedure of Example I was essentially repeated to fabricate hot top rings with several other mixtures according to the present invention. In the following tabulation there is set forth the compositions of each of the mixtures and the average tensile strengths of the cured hot top rings prepared from them. The phenolic liquid resin that was employed for mixture "B" was the same as that used in the first example. The liquid resin employed in the remaining mixtures was a similar phenol-formaldehyde condensation product excepting that it had a solids content between 50 and 60 percent. The same type of slag as in the first example was utilized throughout. In mixture "F," about 1.6 percent of a fusible silica glass powder from a borosilicate glass softening at about 1290° F. was uniformly incorporated in the composition.

| Mixture | Weight Percent in Mixture | | | | | | Average Tensile Strength of Cured Ring, p. s. i. |
|---|---|---|---|---|---|---|---|
| | Resin | MgO, ½ hr. | Soda Ash | Slag, 100 Mesh | Sand AFS 33 | Sand AFS 74 | |
| "A" | 8.0 | 0.8 | 0.8 | -------- | 90.4 | -------- | 805 |
| "B" | 8.0 | 0.8 | 0.8 | -------- | 90.4 | -------- | 943 |
| "C" | 8.0 | 0.8 | 0.8 | 1.6 | 88.8 | -------- | 844 |
| "D" | 8.0 | 0.8 | 0.8 | -------- | -------- | 90.4 | 692 |
| "E" | 6.0 | 0.6 | 0.6 | -------- | 92.8 | -------- | 754 |
| "F" | 6.0 | 0.6 | 0.6 | -------- | 91.2 | -------- | 754 |

Excellent results were obtained in the utilization during ingot pouring with hot top molds of all of the annular hot top rings fabricated from each of the above mixtures.

As is apparent, structures other than hot top rings intended for other uses, including uses at normal temperatures, may also be fabricated with advantage from the compositions of the invention.

Certain changes and modifications in the practice of the present invention can be entered into readily without departing substantially from its intended spirit and scope. Therefore, it is to be fully understood that the invention is not to be limited or otherwise restricted to or by the foregoing deictic description and specification. Rather, it is to be interpreted and construed in the light of what is set forth and defined in the hereto appended claims.

What is claimed is:

1. Composition for the fabrication of porous refractory structures which consists of a preponderant proportion of relatively coarse sand; between about 3 and 10 percent by weight, based on the weight of the composition, of an aqueous phenolic resin liquid binder that is catalyzed with from 10 to 25 percent by weight, based on the weight of the resin in the composition, of an active powdered magnesium oxide catalyst having an initial setting time of less than about six hours, said resin being a phenol-formaldehyde condensation product that has a greater than 1:1 mole ratio of formaldehyde to phenol, respectively, a solids content of at least about 50 percent by weight, a pH between about 5 and 9 and a viscosity at 77° F. of between about 100 and 1000 centipoises; and between about 10 and 25 percent by weight, based on the weight of the resin in the composition, of anhydrous sodium carbonate.

2. The composition of claim 1 in the form of a wet, plastic and flowable mixture.

3. The composition of claim 1, wherein the sand has an AFS fineness number between about 25 and 125.

4. The composition of claim 1, wherein the sand has an AFS fineness number between about 30 and 75.

5. The composition of claim 1, wherein the aqueous phenolic liquid thermosetting resin is a phenol-formaldehyde condensation product that has about a 1.45:1 mole ratio of formaldehyde to phenol, respectively, a solids content of at least about 50 percent by weight, a pH between about 5 and 9 and a viscosity at 77° F. between about 100 and 1,000 centipoises.

6. The composition of claim 1, where in the magnesium oxide catalyst is a finely divided powder that has an initial setting time between about 0.1 and 6 hours.

7. The composition of claim 1, wherein the magnesium oxide catalyst is a finely divided powder that has an initial setting time between about 0.5 and 3 hours and an average particle size not larger than about 40 mesh in the U. S. sieve series.

8. A cured, rigid formed structure prepared from a composition that is in accordance with the composition set forth in claim 1.

9. A refractory ring for hot tops prepared from a composition that is in accordance with the composition set forth in claim 1.

10. Method for the preparation of a composition that is particularly adapted to provide porous refractory structures which consists of the steps of uniformly dispersing a binding proportion of between about 3 and 10 percent by weight, based on the weight of the resulting mixture, of an aqueous phenolic liquid thermosetting resin with a mixture of a preponderant proportion of sand and a catalytic quantity of between about 10 and 25 percent by weight, based on the weight of the resin in the mixture, of an active powdered magnesium oxide for auto-hardening the phenolic liquid resin and subsequently interblending in the resulting wet mixture a small quantity of soda ash, said magnesium oxide catalyst having an initial setting time of less than about six hours, said resin being a phenol-formaldehyde condensation product that has a greater than 1:1 mole ratio of formaldehyde to phenol, respectively, a solids content of at least about 50 percent by weight, a pH between about 5 and 9 and a viscosity at 77° F. between about 100 and 1000 centipoises.

11. Method for fabricating porous refractory structures which consists of the steps of preparing a wet, auto-hardenable mixture of a preponderant proportion of sand with a binding proportion of an active powdered magnesium oxide catalyzed aqueous phenolic liquid thermosetting resin, said magnesium oxide catalyst having an initial setting time of less than about six hours, said resin being a phenol-formaldehyde condensation product that has a greater than 1:1 mole ratio of formaldehyde to phenol, respectively, a solids content of at least about 50 percent by weight, a pH between about 5 and 9 and a viscosity at 77° F. between about 100 and 1000 centipoises, said resin being present in said mixture in an amount between about 3 and 10 percent by weight, based on the weight of the mixture and being catalyzed with between about 10 and 25 percent by weight, based on the weight of the resin in the mixture, of said magnesium oxide, said mixture containing a small quantity of between about 10 and 25 percent by weight, based on the weight of the resin in the mixture, of soda ash; forming said wet mixture into a desired structure while it is in a plastic and flowable condition and before it has auto-hardened; permitting said formed mixture to auto-harden to an agglomerated, integral structure; and subsequently curing the integral, formed mixture at a thermosetting temperature into a rigid structure.

12. The method of claim 11, wherein said mixture is cold formed as a wet, plastic and flowable mass under a pressure between about 100 and 1200 pounds per square inch.

13. The method of claim 11, wherein the formed, auto-hardened mixture is cured at a temperature between about 250 and 600° F. until it is thermoset to a rigid structure.

14. The method of claim 11, wherein the formed, auto-hardened mixture is cured at a temperature of about 475–500° F. for a period of time of at least about 45 minutes.

References Cited in the file of this patent

UNITED STATES PATENTS

| | | |
|---|---|---|
| 2,133,245 | Brice et al. | Oct. 11, 1938 |
| 2,683,296 | Drumm et al. | July 13, 1954 |

FOREIGN PATENTS

| | | |
|---|---|---|
| 305,237 | Great Britain | May 2, 1930 |

OTHER REFERENCES

Carleton-Ellis: "Chemistry of Synthetic Resins." volume 1, page 324.